United States Patent
Zheng

(10) Patent No.: US 11,281,348 B2
(45) Date of Patent: Mar. 22, 2022

(54) ELECTROMAGNETIC FILM OUTLET STRUCTURE, DIRECT-TYPE BACKLIGHT DISPLAY MODULE AND DISPLAY

(71) Applicants: GUANGZHOU SHIYUAN ELECTRONICS CO., LTD., Guangdong (CN); GUANGZHOU SHIRUI ELECTRONICS CO., LTD., Guangdong (CN)

(72) Inventor: Shaohong Zheng, Guangdong (CN)

(73) Assignees: GUANGZHOU SHIYUAN ELECTRONICS CO., LTD., Guangdong (CN); GUANGZHOU SHIRUI ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 17/085,580

(22) Filed: Oct. 30, 2020

(65) Prior Publication Data

US 2021/0048903 A1    Feb. 18, 2021

Related U.S. Application Data

(63) Continuation of application No. PCT/CN2018/118463, filed on Nov. 30, 2018.

(30) Foreign Application Priority Data

May 3, 2018 (CN) .......................... 201820658093.0

(51) Int. Cl.
  *G06F 3/046* (2006.01)
  *G06F 3/041* (2006.01)

(52) U.S. Cl.
  CPC ............ *G06F 3/046* (2013.01); *G06F 3/0412* (2013.01); *G06F 3/0416* (2013.01); *G06F 2203/04102* (2013.01)

(58) Field of Classification Search
  CPC ........... G06F 2203/04102; G06F 3/046; G06F 3/0412; G06F 3/0416; G02F 1/133602;
  (Continued)

(56) References Cited

U.S. PATENT DOCUMENTS

2004/0135936 A1    7/2004  Lee
2012/0313889 A1*  12/2012  Chen ...................... G06F 3/046
                                                                345/174
2018/0039123 A1    2/2018  Kim et al.

FOREIGN PATENT DOCUMENTS

CN    104679339 A    6/2015
CN    106980207 A    7/2017
(Continued)

OTHER PUBLICATIONS

International Application No. PCT/CN2018/118463, International Search Report and Written Opinion dated Feb. 28, 2019, 9 pages.
(Continued)

*Primary Examiner* — Lisa S Landis
(74) *Attorney, Agent, or Firm* — Zhong Law, LLC

(57) ABSTRACT

The present disclosure discloses an electromagnetic film outlet structure, a direct-type backlight display module and a display. The electromagnetic film outlet structure includes a backplate structure, an electromagnetic touch structure, and an outer frame structure; where the electromagnetic touch structure includes a diffusion plate provided above the backplate structure, an electromagnetic film provided corresponding to the diffusion plate, an electromagnetic touch control panel provided outside the backplate structure, and a flexible electromagnetic circuit connecting the electromagnetic film and the electromagnetic touch control panel; and the outer frame structure is sheathed on outside the backplate structure and a sealing frame structure is formed by the outer frame structure and the backplate structure, the diffusion plate, the electromagnetic film and the flexible electro-
(Continued)

magnetic circuit all are located in the sealing frame structure, and the electromagnetic touch panel is located outside the sealing frame structure.

20 Claims, 1 Drawing Sheet

(58) Field of Classification Search
CPC .............. G02F 1/133; G02F 1/133567; G02F 1/133317; G02F 1/1335; G02F 1/133504
See application file for complete search history.

(56) References Cited

FOREIGN PATENT DOCUMENTS

| | | |
|---|---|---|
| CN | 107544710 A | 1/2018 |
| EP | 1956469 A2 | 8/2008 |
| JP | H0713144 A | 1/1995 |
| JP | 2004118207 A | 4/2004 |
| JP | 2004302431 A | 10/2004 |

OTHER PUBLICATIONS

European Application No. EP18917349, Extended European Search Report dated May 7, 2021, 17 pages.
Japanese Application No. 2020561721, Extended European Search Report dated Nov. 18, 2021, 14 pages.

* cited by examiner

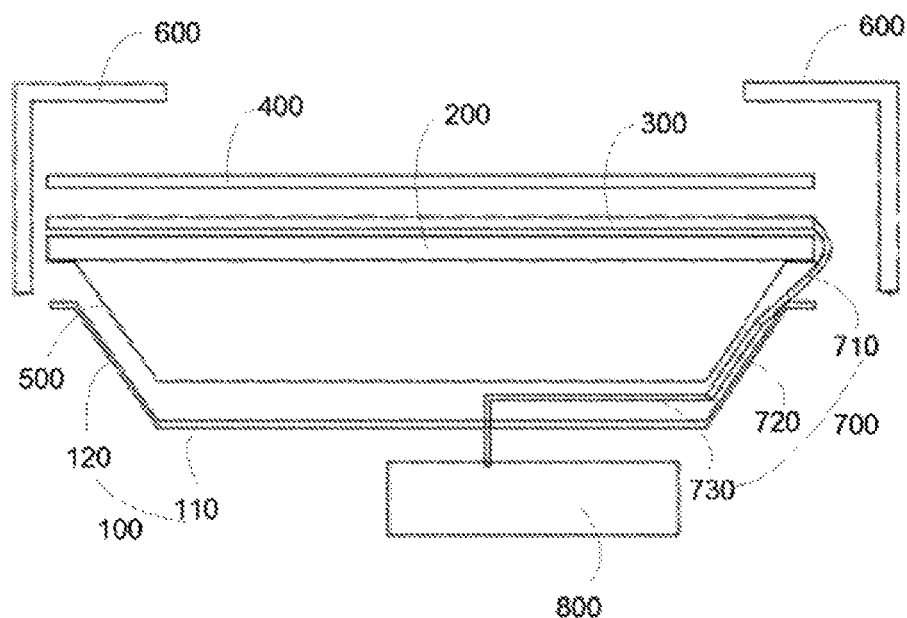

ELECTROMAGNETIC FILM OUTLET STRUCTURE, DIRECT-TYPE BACKLIGHT DISPLAY MODULE AND DISPLAY

CROSS-REFERENCE TO RELATED APPLICATION

This application is a continuation of International Application No. PCT/CN2018/118463, filed on Nov. 30, 2018 which claims priority to Chinese Patent Application No. 201820658093.0, filed on May 3, 2018, both of which are hereby incorporated by reference in their entireties.

TECHNICAL FIELD

The present disclosure relates to the field of LED display device technologies and, in particular, to an electromagnetic film outlet structure, a type of direct-type backlight display module and display.

BACKGROUND

In conventional technologies, a direct backlight display can only be used as a display as a single function. With the development of input technology and display technology, it is a market development trend to combine a commonly used liquid crystal display and a commonly used touch apparatus. Moreover, the market demands increasingly better user experience of touch input, such as the pursuit of handwriting input effect of original handwriting. Thus electromagnetic touch screen technology has been widely deployed, and the electromagnetic touch screen technology has also begun to be deployed in the direct-type backlight display. Moreover, in a backlight display module, an electromagnetic film needs to be connected to an electromagnetic touch control panel through a cable. However, the electromagnetic film needs to be installed inside the backlight display module, and the electromagnetic touch control panel needs to be installed outside the backlight display module. Because the backlight display module in conventional technologies is generally configured as an integrated body, it is very difficult to outlet the electromagnetic film located inside the backlight display module, and it cannot connect the electromagnetic film with the electromagnetic touch control panel without destroying the integrity of the backlight display module and without affecting the display effect of the backlight display module.

SUMMARY

To solve the above-identified and other technical problems, the present disclosure provides an electromagnetic film outlet structure, a direct-type backlight display module and a display, which may facilitate the outlet of an electromagnetic film, and easily implement the connection between the electromagnetic film and electromagnetic touch control panel.

The technical solution is as follows:

an electromagnetic film outlet structure, including a backplate structure, an electromagnetic touch structure, and an outer frame structure;

the electromagnetic touch structure includes a diffusion plate provided above the backplate structure, an electromagnetic film provided corresponding to the diffusion plate, an electromagnetic touch control panel provided outside the backplate structure, and a flexible electromagnetic circuit connecting the electromagnetic film and the electromagnetic touch control panel; and the outer frame structure is sheathed on outside the backplate structure to form a sealing frame structure with the backplate structure, and the diffusion plate, the electromagnetic film and the flexible electromagnetic circuit are all located in the sealing frame structure, and the electromagnetic touch control panel is located outside the sealing frame structure.

The structures, such as diffusion plate and the electromagnetic film, are enclosed inside the sealing frame structure formed by the backplate structure and the outer frame structure, and the flexible electromagnetic circuit installed in the sealing frame structure connects the electromagnetic film located inside the sealing frame structure with the electromagnetic touch control panel located outside the sealing frame structure. Since the flexible electromagnetic circuit has characteristics of being bendable and foldable as a flexible circuit, the flexible electromagnetic circuit may be bendingly arranged according to the structural characteristics of the sealing frame structure, the diffusion plate and the electromagnetic film, or the flexible electromagnetic circuit may be arranged to fit the sealing frame structure, the diffusion plate and the electromagnetic film, so that it is easy to provide the outlet of the electromagnetic film located inside the sealing frame structure, thereby not only implementing its electromagnetic touch function, but also not destroying the integrity of the sealing frame structure, and more importantly, not affecting optical characteristics and display effect of the entire structure.

The technical solutions are further described below:

further, the flexible electromagnetic circuit includes a flexible outlet circuit board connected to an end of the electromagnetic film and bendingly extended toward the backplate structure, and a switching circuit board connecting the flexible outlet circuit board with the electromagnetic touch control panel, where the flexible outlet circuit board is located inside the outer frame structure, and the switching circuit board is provided inside the backplate structure.

Further, the flexible electromagnetic circuit includes a number of the flexible outlet circuit boards connected to one or both ends of the electromagnetic film, and at least one of the switching circuit boards is connected to the flexible outlet circuit boards.

Further, the flexible electromagnetic circuit includes a cable connected to the switching circuit board, where the cable passes through the backplate structure to connect to the electromagnetic touch control panel.

Further, the backplate structure includes a backplate mainboard, and inclined plates respectively provided obliquely on both sides of the backplate mainboard, and the outer frame structure is sheathed outside the inclined plates on both sides;

and the flexible outlet circuit board is bendingly extended from the end of the electromagnetic film via the inner side of the outer frame structure to the inner side of the inclined plate, the switching circuit board is located on the inner side of the inclined plate, and the cable passes through the backplate mainboard and is connected to the electromagnetic touch control panel.

Further, it also includes a reflector provided on the inner side of the backplate structure and corresponding to the diffusion plate, where the flexible outlet circuit board, the switching circuit board and the cable are all provided between the reflector and the backplate structure.

Further, a shape of the reflector corresponds to a shape of the backplate structure, the reflector includes a main reflector plate corresponding to the backplate mainboard and side reflector plates respectively inclined on both sides of the main reflector plate, where the side reflector plates correspond to the inclined plate one-to-one, and the flexible outlet circuit board is bindingly extended to and between the side reflector plates and the inclined plate, the switching circuit board is located between the inclined plate and the side reflector plates, and the cable is located between the main reflector and the backplate mainboard.

Further, the electromagnetic film is provided on top of the diffusion plate, and the electromagnetic touch structure further includes an optical film provided on the electromagnetic film; or the electromagnetic film is provided at bottom of the diffusion plate, and the electromagnetic touch structure further includes an optical film provided on the diffusion plate.

In addition, the present disclosure further provides a direct-type backlight display module including the above-mentioned electromagnetic film outlet structure as described above.

In addition, the present disclosure further provides a display including the direct-type backlight display module as described above.

The present disclosure has the following beneficial effects: by providing a flexible electromagnetic circuit with characteristics of being bendable and deformable, it easily achieves the outlet of the electromagnetic film in the sealing frame structure, the flexible electromagnetic circuit may trace along the inner of the sealing frame structure, the diffusion plate and the reflector, which will not affect the integrity of the entire structure, nor will it affect optical characteristics and display effect of the direct-type backlight display module and the display.

BRIEF DESCRIPTION OF THE DRAWINGS

FIG. 1 is a schematic block diagram of an electromagnetic film outlet structure according to an embodiment of the present disclosure.

ILLUSTRATION OF REFERENCE SIGNS

100—Backplate structure, 110—Backplate mainboard, 120—Inclined plate, 200—Diffusion plate, 300—Electromagnetic film, 400—Optical film, 500—Reflector, 600—Outer frame structure, 700—Flexible electromagnetic circuit, 710—Flexible outlet circuit board, 720—Switching circuit board, 730—Cable, 800—Electromagnetic touch control panel.

DETAILED DESCRIPTION OF THE EMBODIMENTS

Embodiments of the present disclosure are described in detail below, and examples of the embodiments are shown in the drawing. The embodiments described below with reference to the drawing are exemplary, and are only used to explain the present disclosure, and are not understood as limitations to the present disclosure.

As shown in FIG. 1, an embodiment of the present disclosure includes an electromagnetic film outlet structure, which includes a backplate structure 100, an electromagnetic touch structure, and an outer frame structure 600, where the backplate structure 100 may provide support for the electromagnetic touch structure and the outer frame structure 600. The electromagnetic touch structure is used to provide an electromagnetic touch function, and the outer frame structure 600 may seal and support the electromagnetic touch structure and the backplate structure 100 from a peripheral side.

Specifically, the above-mentioned electromagnetic touch structure includes a diffusion plate 200 provided above the backplate structure 100, an electromagnetic film 300 provided corresponding to the diffusion plate 200, an electromagnetic touch control panel 800 provided outside the backplate structure 100, and a flexible electromagnetic circuit 700 connecting the electromagnetic film 300 and the electromagnetic touch control panel 800. Moreover, the outer frame structure 600 is sheathed on the outside of the backplate structure 100 and surrounds the backplate structure 100 to form a sealing frame structure. The diffusion plate 200, the electromagnetic film 300 and the flexible electromagnetic circuit 700 are all located within the sealing frame structure, and the electromagnetic touch control panel 800 is located outside the sealing frame structure. In this way, the sealing frame structure formed by the backplate structure 100 and the outer frame structure 600 encloses the diffusion plate 200 and the electromagnetic film 300 therein, and by providing the flexible electromagnetic circuit 700 in the sealing frame structure, the electromagnetic film 300 located inside the sealing frame structure may be connected to the electromagnetic touch control panel 800 located outside the sealing frame structure. Since the flexible electromagnetic circuit 700 has the characteristics of being bendable and foldable as a flexible circuit, the flexible electromagnetic circuit 700 may be bendingly arranged according to the structural characteristics of the sealing frame structure, the diffusion plate 200 and the electromagnetic film 300, and may also be arranged to fit the sealing frame structure, the diffusion plate 200 and the electromagnetic film 300, to make a simple outlet of the electromagnetic film in the sealing frame structure, thereby not only implementing its electromagnetic touch function, but not destroying the integrity of the sealing frame structure, and more importantly, not affecting the optical characteristics and display effect of the entire structure.

Moreover, the flexible electromagnetic circuit 700 includes a flexible outlet circuit board 710 connected to an end of the electromagnetic film 300, and bendingly extended toward the backplate structure 100, and a switching circuit board 720 connecting the flexible outlet circuit board 710 with the electromagnetic touch control panel 800. The flexible outlet circuit board 710 is located inside the outer frame structure 600, and the switching circuit board 720 is provided inside the backplate structure 100. By providing the flexible outlet circuit board 710 at the end of the electromagnetic film 300, and providing the switching circuit board 720 on the inner side of the backplate structure 100, the outlet circuit of the electromagnetic film 300, namely the flexible outlet circuit board 710, may be conveniently bindingly extended from the end of the electromagnetic film 300 to the inner side of the backplate structure 100, using the flexible and bendable characteristics of the flexible outlet circuit board 710, so that the outlet of the electromagnetic film 300 inside the outer frame structure 600 and the backplate structure 100 may be easy and simple, and there is no need to destroy the integrity of the electromagnetic touch structure and the sealing frame structure. In addition, by providing the flexible electromagnetic circuit 700 as the structure form of the flexible outlet circuit board 710 and the switching circuit board 720, not only the flexible characteristics of the flexible outlet circuit board 710 may be used to the outlet of the electromagnetic film 300, but also the switching circuit board 720 may be configured as an ordinary circuit board, thereby reducing the cost of the flexible electromagnetic circuit 700.

Further, the above-mentioned flexible electromagnetic circuit may include a plurality of flexible outlet circuit boards 710 connected to one or both ends of the electromagnetic film 300, and at least one switching circuit board 720 connected to the plurality of flexible outlet circuit boards 710. Moreover, one or more electromagnetic films 300 may be provided on the diffusion plate 200, and these electromagnetic films 300 may be located at different positions of the diffusion plate 200. That is, the plurality of flexible outlet circuit boards 710 may be used for the connection through the outlet to one or more electromagnetic films 300, and these flexible outlet circuit boards 710 may be provided on one or both ends or multiple ends of the electromagnetic films 300, to make it possible to achieve multiple outlets for one electromagnetic film 300, or to achieve outlets for multiple electromagnetic films 300, respectively. Moreover, the flexible outlet circuit boards 710 may be wired and switched through one or more switching circuit boards 720, so that the flexible outlet circuit boards 710 located at different positions may be switched freely and conveniently. In addition, the switching circuit board 720 may be pre-fixed inside the backplate structure 100, so that only the flexible outlet circuit board 710 needs to be connected to the switching circuit board 720 during the assembly process, which is simple and convenient. In addition, the flexible outlet circuit board 710 may also be set as a circuit structure with connection-pegs at both ends, and may be easily inserted on the electromagnetic film 300 and the switching circuit board 720 through the connection-pegs.

In addition, the flexible electromagnetic circuit 700 further includes a cable 730 connected to the switching circuit board 720, and the cable 730 may pass through the backplate structure 100 and be connect to the electromagnetic touch control panel 800. Thus, the connection between the electromagnetic film 300 and the electromagnetic touch control panel 800 is achieved through the flexible outlet circuit board 710, the switching circuit board 720, and the cable 730, so as to realize the electromagnetic touch function. Moreover, the cable 730 may directly pass through the backplate structure 100, that is, a hole is trepanned on the backplate structure 100 to realize the cable threading; and the cable 730 may also bypass the backplate structure 100 and pass through a gap of the backplate structure 100. In this way, it is convenient to fix the switching circuit board 720 on the backplate structure 100 in advance, and then conveniently connects the switching circuit board 720 connected to the flexible outlet circuit board 710 to the electromagnetic touch control panel 800 by setting the cable 730, thereby facilitating the outlet of the electromagnetic film 300.

In addition, the back plate structure 100 includes a backplate mainboard 110, and inclined plates 120 respectively provided obliquely on both sides of the backplate mainboard 110. The outer frame structure 600 is sheathed outside the inclined plates 120 on both sides, thereby forming the above-mentioned sealing frame structure. Moreover, the flexible outlet circuit board 710 is bendingly extended from the end of the electromagnetic film 300 via the inner side of the outer frame structure 600 (mainly refers to the side facing the end of the electromagnetic film 300) to the inner side of the inclined plate 120 (mainly refers to the side facing the diffusion plate 200), and the switching circuit board 720 is located inside the inclined plate 120, and the cable 730 may pass through the backplate mainboard 110 to connect to the electromagnetic touch control panel 800. That is, according to the structural characteristics of the backplate structure 100, the electromagnetic film 300, the diffusion plate 200 and the outer frame structure 600, the flexible outlet circuit board 710 and the switching circuit board 720 are provided along the inner side of these structures, which will not affect the structural arrangement of the entire structure, i.e. will not affect the sealing, connection and supporting performance of its original structure, nor will it affect the optical characteristics and display effect of its original structure. In the embodiment, the switching circuit board 720 may be pre-fixed on the inner side of the inclined plate 120 of the back plate structure 100.

In addition, the above-mentioned electromagnetic film outlet structure further includes a reflector 500 provided on the inner side of the backplate structure 100 (mainly refers to the side facing the diffusion plate 200) and corresponding to the diffusion plate 200. The flexible outlet circuit board 710, the switching circuit board 720 and the cable 730 are all provided between the reflector 500 and the backplate structure 100. That is, the flexible electromagnetic circuit 700 is sandwiched between the reflector 500 and the backplate structure 100, which is convenient for tracing and does not affect the arrangement of the optical structure and the entire structure and does not affect the optical characteristics and display effect of the structure. Further, the shape of the reflector 500 and the shape of the back plate structure 100 correspond to each other. Specifically, the reflector 500 includes a main reflector plate corresponding to the backplate mainboard 110, and side reflector plates respectively provided obliquely on both sides of the main reflector. The side reflector plates correspond to the inclined plate 120 one-to-one, and the flexible outlet circuit board 710 is bendingly extended to and between the side reflector side plates and the inclined plate 120. The switching circuit board 720 is located between the inclined plate 120 and the side reflector plate, the cable 730 is located between the main reflector plate and the backplate mainboard. In this way, the structure of the reflector 500 may be kept corresponding to the structure of the backplate structure 100, thereby facilitating the positioning and wiring of the flexible electromagnetic circuit 700.

In addition, the electromagnetic film 300 may be provided on the top of the diffusion plate 200 (refers to the side of the diffusion plate 200 facing away from the back plate structure 100), and the above-mentioned electromagnetic touch structure further includes an optical film 400 provided on the electromagnetic film 300. Or, the electromagnetic film 300 may also be provided at the bottom of the diffusion plate 200 (refers to the side of the diffusion plate 200 facing the backplate structure 100), and the above-mentioned electromagnetic touch structure further includes an optical film 400 provided on the diffusion plate 200. That is, the electromagnetic film 300 may be provided above or below the diffusion plate 200. The above-mentioned electromagnetic touch structure may further include an optical film 400 provided on the electromagnetic film 300 or on the diffusion plate 200, and the optical film 400 is also located in the outer frame structure 600. Moreover, the electromagnetic film 300 may be provided on the top or bottom of the diffusion plate 200 in a full fitting or frame fitting manner. By providing the optical film 400, the optical characteristics and display effect may be realized and enhanced, and the electromagnetic film 300 may also be protected.

In addition, the present disclosure further provides a direct-type backlight display module which includes the electromagnetic film outlet structure as described above. In addition, the present disclosure further provides a display which includes the direct-type backlight display module as described above. In the direct-type backlight display module and the display, by providing flexible electromagnetic circuit with characteristics of being bendable and deformable, it easily achieves the outlet of the electromagnetic film in the sealing frame structure, the flexible electromagnetic circuit may trace along the inner of the sealing frame structure, the diffusion plate and the reflector, which will not affect the integrity of the entire structure, nor will it affect the optical performance and the display effect of the direct-type backlight display module and the display.

In addition, it should also be understood that, in the embodiment, the positional relationships indicated by the terms, such as "down", "up", "front", "rear", "left", "right", "inner", "outer", "top", "bottom", "one side", "the other side", "one end", "the other end", are based on the positional relationship shown in the drawing; and the terms, such as "first", "second", are used to distinguish different structural components. These terms are only used to facilitate describing the present disclosure and simplifying the description, and should not be understood as limiting the present disclosure.

The technical features of the above-mentioned embodiments may be combined arbitrarily, in order to make the description concise, all possible combinations of the technical features in the embodiments are not all described, however, as long as there is no contradiction among the combinations of these technical features, it should be regarded as the scope of the description.

The above-mentioned embodiments only express several implementations of the present disclosure with a specific and detailed description, but they cannot therefore be understood as limitations on the scope of the present disclosure. It should be pointed out that for those of ordinary skilled in the art, without departing from the concept of the present disclosure, several modifications and improvements can be made, all of which fall within the protection scope of the present disclosure. Therefore, the protection scope of the present disclosure should be subject to the attached claims.

What is claimed is:

1. An electromagnetic film outlet structure, comprising a backplate structure, an electromagnetic touch structure, and an outer frame structure,
    wherein the electromagnetic touch structure comprises a diffusion plate provided above the backplate structure, an electromagnetic film provided corresponding to the diffusion plate, an electromagnetic touch control panel provided outside the backplate structure, and a flexible electromagnetic circuit connecting the electromagnetic film and the electromagnetic touch control panel, and
    the outer frame structure is sheathed on outside the backplate structure and a sealing frame structure is formed by the outer frame structure and the backplate structure, and the diffusion plate, the electromagnetic film and the flexible electromagnetic circuit are all located in the sealing frame structure, and the electromagnetic touch control panel is located outside the sealing frame structure.

2. The electromagnetic film outlet structure according to claim 1, wherein the flexible electromagnetic circuit comprises a flexible outlet circuit board connected to an end of the electromagnetic film and bendingly extended toward the backplate structure, and a switching circuit board connecting the flexible outlet circuit board with the electromagnetic touch control panel, wherein the flexible outlet circuit board is located inside the outer frame structure, and the switching circuit board is provided inside the backplate structure.

3. The electromagnetic film outlet structure according to claim 2, wherein the flexible electromagnetic circuit comprises a plurality of the flexible outlet circuit boards connected to one or both ends of the electromagnetic film, and at least one the switching circuit board connected to the plurality of flexible outlet circuit boards.

4. The electromagnetic film outlet structure according to claim 2, wherein the flexible electromagnetic circuit further comprises a cable connected to the switching circuit board, wherein the cable passes through the backplate structure to connect to the electromagnetic touch control panel.

5. The electromagnetic film outlet structure according to claim 3, wherein the flexible electromagnetic circuit further comprises the cable connected to the switching circuit board, wherein the cable passes through the backplate structure to connect to the electromagnetic touch control panel.

6. The electromagnetic film outlet structure according to claim 4, wherein the backplate structure comprises a backplate mainboard and inclined plates respectively provided obliquely on both sides of the backplate mainboard, and the outer frame structure is sheathed outside the inclined plates on both sides; and
    the flexible outlet circuit board is bendingly extended from the end of the electromagnetic film via the inner side of the outer frame structure to the inner side of the inclined plate, and the switching circuit board is located on the inner side of the inclined plate, and the cable passes through the backplate mainboard and is connected to the electromagnetic touch control panel.

7. The electromagnetic film outlet structure according to claim 6, further comprising a reflector provided on the inner side of the backplate structure and corresponding to the diffusion plate, wherein the flexible outlet circuit board, the switching circuit board and the cable are all provided between the reflector and the backplate structure.

8. The electromagnetic film outlet structure according to claim 7, wherein a shape of the reflector corresponds to a shape of the backplate structure, the reflector comprises a main reflector plate corresponding to the backplate mainboard and side reflector plates respectively inclined on both sides of the main reflector plate, wherein the side reflector plates correspond to the inclined plate one-to-one, and the flexible outlet circuit board is bent and extended to and between a side reflector plate and the inclined plate, the switching circuit board is located between the inclined plate and the side reflector plate, and the cable is located between the main reflector plate and the backplate mainboard.

9. The electromagnetic film outlet structure according to claim 2, wherein the electromagnetic film is provided on top of the diffusion plate, and the electromagnetic touch structure further comprises an optical film provided on the electromagnetic film; or
    the electromagnetic film is provided at bottom of the diffusion plate, and the electromagnetic touch structure further comprises an optical film provided on the diffusion plate.

10. The electromagnetic film outlet structure according to claim 3, wherein the electromagnetic film is provided on top of the diffusion plate, and the electromagnetic touch structure further comprises an optical film provided on the electromagnetic film; or
    the electromagnetic film is provided at bottom of the diffusion plate, and the electromagnetic touch structure further comprises an optical film provided on the diffusion plate.

11. A direct-type backlight display module, comprising an electromagnetic film outlet structure, wherein the electromagnetic film outlet structure comprises a backplate structure, an electromagnetic touch structure, and an outer frame structure;

wherein the electromagnetic touch structure comprises a diffusion plate provided above the backplate structure, an electromagnetic film provided corresponding to the diffusion plate, an electromagnetic touch control panel provided outside the backplate structure, and a flexible electromagnetic circuit connecting the electromagnetic film and the electromagnetic touch control panel; and the outer frame structure is sheathed on outside the backplate structure, and a sealing frame structure is formed by the outer frame structure and the backplate structure, and the diffusion plate, the electromagnetic film and the flexible electromagnetic circuit are all located within the sealing frame structure, and the electromagnetic touch control panel is located outside the sealing frame structure.

12. The direct-type backlight display module according to claim 11, wherein the flexible electromagnetic circuit comprises a flexible outlet circuit board connected to an end of the electromagnetic film and bendingly extended toward the backplate structure, and a switching circuit board connecting the flexible outlet circuit board with the electromagnetic touch control panel, wherein the flexible outlet circuit board is located inside the outer frame structure, and the switching circuit board is provided inside the backplate structure.

13. The direct-type backlight display module according to claim 12, wherein the flexible electromagnetic circuit comprises a plurality of the flexible outlet circuit boards connected to one or both ends of the electromagnetic film, and the switching circuit board connected to the plurality of flexible outlet circuit boards.

14. The direct-type backlight display module according to claim 12, wherein the flexible electromagnetic circuit further comprises a cable connected to the switching circuit board, wherein the cable passes through the backplate structure to connect to the electromagnetic touch control panel.

15. The direct-type backlight display module according to claim 13, wherein the flexible electromagnetic circuit further comprises a cable connected to the switching circuit board, wherein the cable passes through the backplate structure to connect to the electromagnetic touch control panel.

16. The direct-type backlight display module according to claim 14, wherein the backplate structure comprises a backplate mainboard and inclined plates respectively provided obliquely on both sides of the backplate mainboard, and the outer frame structure is sheathed outside the inclined plates on both sides; and the flexible outlet circuit board is bendingly extended from the end of the electromagnetic film via the inner side of the outer frame structure to the inner side of the inclined plate, the switching circuit board is located on the inner side of the inclined plate, and the cable passes through the backplate mainboard and is connected to the electromagnetic touch control panel.

17. The direct-type backlight display module according to claim 16, further comprising a reflector provided on the inner side of the backplate structure and corresponding to the diffusion plate, wherein the flexible outlet circuit board, the switching circuit board and the cable are all provided between the reflector and the backplate structure.

18. The direct-type backlight display module according to claim 17, wherein a shape of the reflector corresponds to a shape of the backplate structure, the reflector comprises a main reflector plate corresponding to the backplate mainboard and side reflector plates respectively inclined on both sides of the main reflector plate, wherein the side reflector plates correspond to the inclined plate one-to-one, and the flexible outlet circuit board is bent and extended to and between a side reflector plate and the inclined plate, the switching circuit board is located between the inclined plate and the side reflector, and the cable is located between the main reflector plate and the backplate mainboard.

19. The direct-type backlight display module according to claim 12, wherein the electromagnetic film is provided on top of the diffusion plate, and the electromagnetic touch structure further comprises an optical film provided on the electromagnetic film; or the electromagnetic film is provided at bottom of the diffusion plate, and the electromagnetic touch structure further comprises an optical film provided on the diffusion plate.

20. A display, comprising the direct-type backlight display module according to claim 11.

\* \* \* \* \*